United States Patent [19]

Webb

[11] Patent Number: 4,703,077

[45] Date of Patent: Oct. 27, 1987

[54] CHEMICAL COMPOSITIONS COMPRISING (1) METHYL METHACRYLATE POLYMER (2) P.E. WAX (3) FAST-EVAPORATING SOLVENT AND (4) SLOW-EVAPORATING SOLVENT

[76] Inventor: Johannes A. V. Webb, 6th Avenue, Melkbosstrand 7405, South Africa

[21] Appl. No.: 867,560

[22] Filed: May 28, 1986

[51] Int. Cl.$^4$ ............................ C08K 5/01; C08K 5/02
[52] U.S. Cl. .................................... 524/462; 524/463; 524/487; 524/560
[58] Field of Search ................................ 524/462, 463

[56] References Cited

U.S. PATENT DOCUMENTS

| Re. 24,414 | 1/1958 | Stetz et al. | 524/463 |
|---|---|---|---|
| 2,731,436 | 1/1956 | Stetz et al. | 524/463 |
| 2,739,953 | 5/1956 | Rogers | 524/463 |
| 3,413,254 | 11/1968 | Gander | 524/462 |
| 3,463,754 | 8/1969 | Nusser et al. | 524/462 |
| 3,972,446 | 8/1976 | Williams et al. | 222/3 |
| 3,997,498 | 12/1976 | Reese et al. | 524/463 |

FOREIGN PATENT DOCUMENTS 0148017  1/1952  Australia .............................. 524/462

*Primary Examiner*—Herbert J. Lilling
*Attorney, Agent, or Firm*—Larson and Taylor

[57] ABSTRACT

A chemical composition for use as an anti-glare agent on surfaces, such as television screens and/or glass covered objects such as pictures. The composition includes
  (a) an organic material dissolvable in a fast evaporating solvent,
  (b) a fast evaporating solvent for the organic material,
  (c) a wax material dissolvable in a slow evaporating solvent, and
  (d) a slow evaporating solvent for the wax material.

7 Claims, No Drawings

CHEMICAL COMPOSITIONS COMPRISING (1) METHYL METHACRYLATE POLYMER (2) P.E. WAX (3) FAST-EVAPORATING SOLVENT AND (4) SLOW-EVAPORATING SOLVENT

FIELD OF INVENTION

The present invention relates to chemical compositions.

More particularly, the invention relates to chemical compositions for use as an anti-glare agent on surfaces, such as on TV screens or glass covered objects such as pictures.

SUMMARY OF INVENTION

According to the invention, a chemical composition for use as an anti-glare agent on surfaces, such as television screens and/or glass covered objects such as pictures, includes (a) about 1 to about 10 weight percent of a clear methylmethacrylate copolymer;

(b) about 0.1 to about 1 weight percent of a polyethylene wax material capable of being dissolved in a slow-evaporating solvent;

(c) about 80 to 85 weight percent of a fast-evaporating solvent comprising 1,1,1-trichloro-ethane, for said copolymer; and (d) about 13 to 20 weight percent of a slow-evaporating solvent comprising xylene, for said wax material.

The composition may additionally include a propellant. The propellant may be selected from trichloro-fluoromethane, dichloro-difluoromethane, di-chlorofluoro-methane and chloro-difluoromethane.

Also according to the invention, the organic material (eg. methylmethacrylate copolymer) is dissolved in the fast evaporating solvent, and the wax is dissolved in the slow evaporating solvent with the application of heat.

The mixture may be prepared by adding the polyethylene solution to trichloro-ethane solution, whilst stirring fairly vigorously. A hazy solution results of which about 20% by mass is separated on top as a thickish emulsion on standing.

Freon 11 (trichloro-fluoromethane) 90% and freon 12 (dichloro-fluoromethane) 10% may be used as propellant.

In the end result the xylene, polyethylene, resin and trichloro-ethane may constitute about 40% by mass and the propellant about 60% by mass.

The trichloro-ethane and the propellant assist in rendering the composition non-flammable.

On applying the composition according with the invention on a screen, the resin is deposited on the screen because the trichloro-ethane evaporates faster than the xylene. Part of the resin, which is dissolved in the xylene with polyethylene, is deposited on the smooth resin layer as a crystalline, hard surface, which refracts light and provides an anti-glare effect if light is directed onto the treated surface.

The slow evaporating solution tends to move to the outside.

EXAMPLES

The invention will now be described by way of example with reference to a number of examples of compositions in accordance with the invention.

EXAMPLE 1

In a first example of the mixture in accordance with the invention, the composition is as follows:
1. Organic material in the form of a clear polymer: methylmethacrylate copolymer, 1 to 10% by mass.
2. Wax material: polyethylene wax (AC6 or equivalent), 0,1 to 1% by mass.
3. Fast evaporating solvents: 1,1,1-trichloro-ethane, about 80% by mass.
4. Slow evaporating solvent: xylene, about 20% by mass.

EXAMPLE 2

In another example of the mixture in accordance with the invention, the composition is as follows:
1. Organic material in the form of a clear polymer: methylmethacrylate copolymer, about 3% by mass.
2. Wax material: polyethylene wax (AC6 or equivalent), about 0,3% by mass.
3. Fast evaporating solvents: 1,1,1-trichloro-ethane, about 85% by mass.
4. Slow evaporating solvent: xylene, about 14% by mass.

EXAMPLE 3

In a third example of the mixture in accordance with the invention, the composition is as follows:
1. Organic material in the form of a clear polymer: methylmethacrylate copolymer, about 2,66% by mass.
2. Wax material: polyethylene wax (AC6 or equivalent), about 0,27% by mass.
3. Fast evaporating solvents: 1,1,1-trichloro-ethane, about 84% by mass.
4. Slow evaporating solvent: xylene, about 13,07% by mass.

EXAMPLE 4

In a fourth example of the mixture in accordance with the invention, the composition is as follows:
1. Organic material in the form of a clear polymer: methylmethacrylate copolymer, about 1,79% by mass.
2. Wax material: polyethylene wax (AC6 or equivalent), about 0,21% by mass.
3. Fast evaporating solvents: 1,1,1-trichloro-ethane, about 63% by mass.
4. Slow evaporating solvent: xylene, about 9,8% by mass.

To the above freon 22 (in a quantity of about 25% by mass) is added as propellant.

I claim:

1. A chemical composition for use as an anti-glare agent on television screens and glass-covered surfaces comprising:

(a) about 1 to about 10 weight percent of a clear methylmethacrylate polymer;

(b) about 0.1 to about 1 weight percent of a polyethylene wax material capable of being dissolved in a slow-evaporating solvent;

(c) about 80 to about 85 weight percent of a fast-evaporating solvent comprising 1,1,1-trichloro-ethane for said polymer; and (d) about 13 to about 20 weight percent of a slow-evaporating solvent comprising xylene for said wax material.

2. A composition as claimed in claim 1 further comprising a propellant.

3. A composition as claimed in claim 2 wherein said propellant comprises trichloro-fluoromethane.

4. A composition as claimed in claim 2 wherein said propellant comprises dichloro-difluoromethane.

5. A composition as claimed in claim 2 wherein said propellant comprises di-chloro-fluoro-methane.

6. A composition as claimed in claim 2 wherein said propellant comprises chloro-difluoromethane.

7. A composition as claimed in claim 1 wherein said fast-evaporating solvent comprises about 80 weight percent of said composition and said slow-evaporating solvent comprises about 20 weight percent of said composition.

* * * * *